United States Patent
Shamshoum et al.

(10) Patent No.: US 6,255,247 B1
(45) Date of Patent: Jul. 3, 2001

(54) OPTIMUM EXTERNAL CO-CATALYST ELECTRON DONOR MOLAR RATIO IN PROPYLENE POLYMERIZATION

(75) Inventors: Edwar Shoukri Shamshoum, Houston; David John Rauscher, Webster, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/351,385

(22) Filed: Jul. 13, 1999

Related U.S. Application Data

(62) Division of application No. 08/584,643, filed on Jan. 11, 1996, which is a continuation of application No. 08/477,024, filed on Jun. 7, 1995, now abandoned, which is a division of application No. 07/995,451, filed on Dec. 22, 1992, now abandoned.

(51) Int. Cl.$^7$ ..................................... B01J 31/00
(52) U.S. Cl. .................. 502/158; 502/125; 502/108; 502/104; 502/227; 526/119; 526/126; 526/351; 526/124.1; 526/127
(58) Field of Search ..................................... 502/158, 125, 502/108, 104, 227; 526/119, 126, 351, 124.1, 127

(56) References Cited

U.S. PATENT DOCUMENTS

| 4,927,797 | * | 5/1990 | Ewen | ................................... 502/127 |
| 5,066,737 | | 11/1991 | Job | ..................................... 526/119 |

FOREIGN PATENT DOCUMENTS

| 0291958 | | 11/1988 | (EP) . |
| 0 517 183 | * | 12/1992 | (EP) . |
| 06025341 | * | 2/1994 | (JP) . |

\* cited by examiner

*Primary Examiner*—David W. Wu
*Assistant Examiner*—Ling-Siu Choi
(74) *Attorney, Agent, or Firm*—Jim D. Wheelington

(57) ABSTRACT

This invention is for a process for the polymerization of propylene to a minimum level of xylene solubles by use of the molar ratio of co-catalyst to external electron donor (selectivity control agent). Using a conventional supported heterogeneous Ziegler-Natta catalyst component with an trialkyl aluminum co-catalyst and an cycloalkylalkyl-dialkoxysilane external electron nor (selectivity control agent) in a Al/Si molar ratio of about results in the minimum amount of xylene solubles.

4 Claims, 3 Drawing Sheets

OPTIMUM EXTERNAL CO-CATALYST ELECTRON DONOR MOLAR RATIO IN PROPYLENE POLYMERIZATION

"This is a divisional application of co-pending application Ser. No. 08/584,643, filed on Jan. 11, 1996, now pending which is a continuation application of application Ser. No. 08/477,024 filed on Jun. 7, 1995, now abandoned, which is a divisional application of application Ser. No. 07/995,451, filed on Dec. 22, 1992, now abandoned".

SPECIFICATION

BACKGROUND OF THE INVENTION

1. Field of the Invention

This invention relates to a process for the controlled polymerization of stereospecific alpha-olefins having a preselected level of xylene solubles, more specifically, a process for controlling xylene solubles in polypropylene to the minimum level by use of the molar ratio of co-catalyst to external electron donor (selectivity control agent).

2. Description of the Prior Art

Polypropylene manufacturing processes typically involve the polymerization of propylene monomer with an organometallic catalyst of the Ziegler-Natta type. The Ziegler-Natta type catalyst polymerizes the propylene monomer to produce predominantly solid crystalline polypropylene. Many desirable product properties, such as strength and durability, depend on the crystallinity of the polypropylene which in turn is dependent on the stereospecific arrangement of methyl groups on the polymer backbone. One form of crystalline polypropylene is isotactic polypropylene in which the methyl groups are aligned on the same side of the polymer chain as opposed to atactic polypropylene in which the methyl groups are randomly positioned.

The isotactic structure is typically described as having the methyl groups attached to the tertiary carbon atoms of successive monomeric units on the same side of a hypothetical plane through the main chain of the polymer, e.g., the methyl groups are all above or all below the plane. Using the Fischer projection formula, the stereochemical sequence of isotactic polypropylene is described as follows:

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

This crystallinity distinguishes isotactic polymers from an amorphous or atactic polymer which is soluble in xylene. Atactic polymer exhibits no regular order of repeating unit configurations in the polymer chain and forms essentially a waxy product. While it is possible for a catalyst to produce both amorphous and crystalline, it is desirable for a catalyst to produce predominantly crystalline polymer with very little atactic polymer.

Catalyst systems for the polymerization of olefins are well known in the art. Typically, these systems include a Ziegler-Natta type polymerization catalyst; a co-catalyst, usually an organoaluminum compound; and an external electron donor compound or selectivity control agent, usually an organosilicon compound. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

A Ziegler-Natta type polymerization catalyst is basically a complex derived from a halide of a transition metal, for example, titanium, chromium or vanadium with a metal hydride and/or a metal alkyl, typically an organoaluminum compound, as a co-catalyst. The catalyst is usually comprised of a titanium halide supported on a magnesium compound complexed with an alkylaluminum co-catalyst.

The development of these polymerization catalysts has proceeded seemingly in generations of catalysts. The catalysts disclosed in the patents referenced above are considered by most to be third generation catalysts. With each new generation of catalysts, the catalyst properties have improved, particularly the efficiencies of the catalysts, as expressed in kilograms of polymer product per gram of catalyst in two hours.

In addition to the improved catalysts, improved activation methods have also lead to increases in the catalyst efficiency. A most recent discovery includes a process for prepolymerizing the catalyst just prior to introducing the catalyst into the reaction zone. This process is disclosed in U.S. Pat. No. 4,767,735 the disclosure of which is hereby incorporated by reference.

It is generally possible to control catalyst productivity and product isotacticity within limits by adjusting the molar feed ratio of co-catalyst to external electron donor. Increasing the amount of external electron donor decreases the xylene solubles but may reduce activity and hence catalyst productivity. The stereoselectivity can be measured by the Isotactic Index (II) or the Xylene Solubles (XS) of the polypropylene product.

Selectivity to isotactic polypropylene is typically determined under the XS test by measuring the amount of polypropylene materials which are xylene soluble. The xylene-solubles were measured by dissolving polymer in hot xylene, cooling the solution to 0° C. and precipitating out the crystalline material. The xylene solubles are the wt. % of the polymer that was soluble in the cold xylene.

The Isotactic Index (II), on the other hand, measures the amount of polypropylene material insoluble in n-heptane. Although the two tests, XS and II, are generally run using different solvents, they generate results which are predictably related since one test (XS) measures insolubility and the other (II) measures solubility. Both XS and II can be measured using known laboratory sampling techniques.

It would be advantageous to determine the optimum molar ratio of co-catalyst to external electron donor to minimize the amount of xylene solubles in polypropylene.

SUMMARY OF THE INVENTION

Accordingly, this invention provides a catalyst, a method of making the catalyst and a method of using the catalyst for polymerization of propylene to produce a polypropylene product having the minimum amount of xylene solubles.

This and other objects are accomplished by catalyst comprising:

a) a conventional supported Ziegler-Natta catalyst component for the polymerization of propylene;

b) an aluminum trialkyl co-catalyst described by the formula AlR'$_3$ where R' is an alkyl of from 1–8 carbon atoms and R' may be the same or different; and c) an external electron donor either simultaneously with or after step (b), said external electron donor having the general formula SiR$_m$(OR')$_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different; wherein the molar ratio of co-catalyst to external electron donor is equivalent to about 4–m.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

Figure 1:
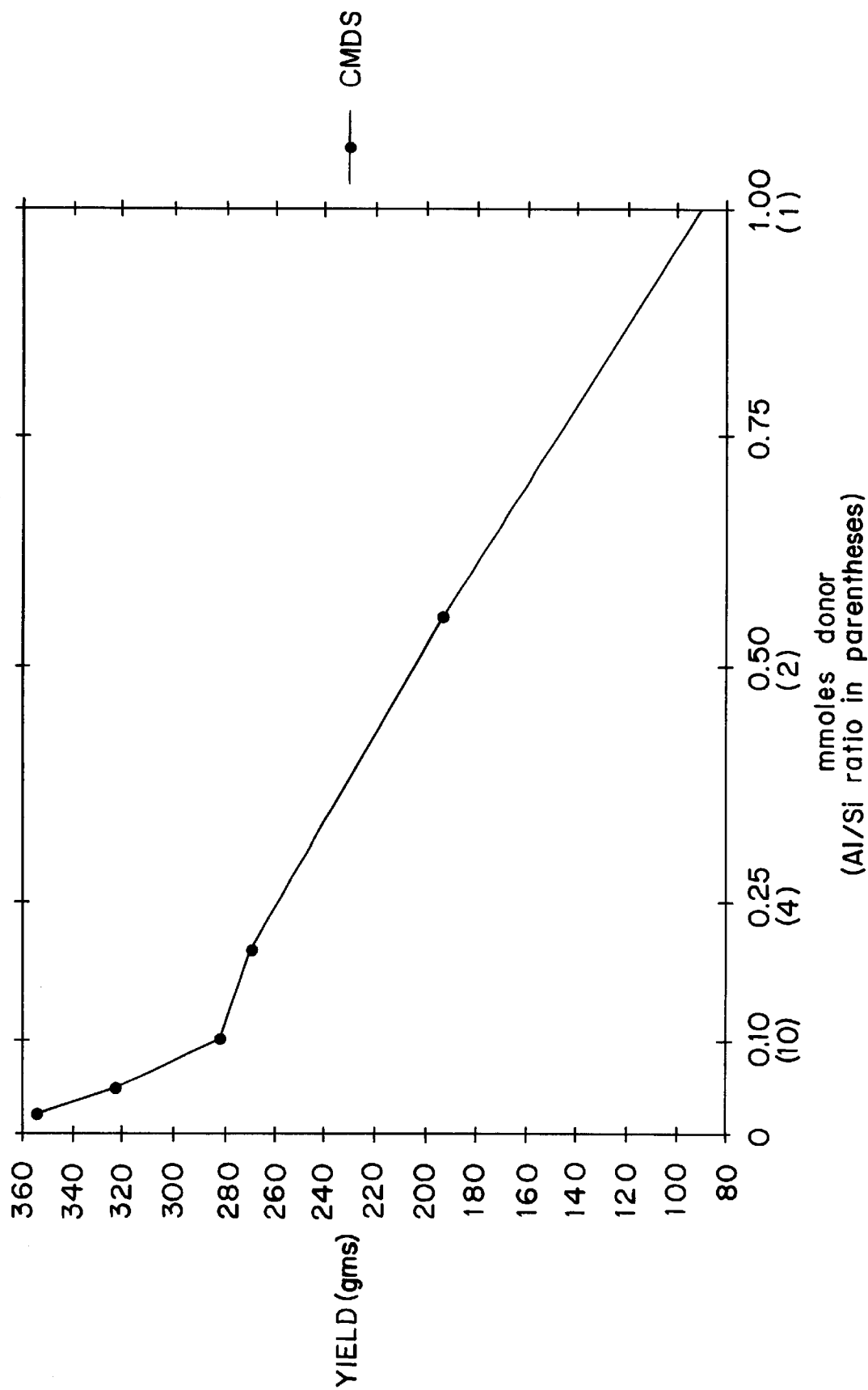
FIG. 1 is a graph of co-catalyst to external electron donor molar ratio versus polymer yield.

Generally, the components of a conventional Ziegler-Natta catalyst system are an aluminum alkyl and a transition metal compound with, optionally, an external electron donor. Examples of such catalyst systems are disclosed in U.S. Pat. Nos. 4,107,413; 4,294,721; 4,439,540; 4,115,319; 4,220,554; 4,460,701 and 4,562,173, which are hereby incorporated by reference.

Any of the conventional supported heterogeneous Ziegler-Natta transition metal compound catalyst components used for the polymerization of propylene can be utilized as the catalyst component of the catalyst system of the present invention. The compound is preferably of the general formula MR$^+_x$ where M is a transition metal, R$^+$ is chosen from the group consisting of a halogen or a hydrocarbyloxy, R$^+$ being the same or different with at least one R$^+$ being a halogen, and x is the valence of the metal. Preferably, M is a Group IVB metal and, most preferably, M is titanium. Preferably, R is chlorine, bromine, an alkoxy or a phenoxy, more preferably chlorine or ethoxy and most preferably, chlorine. Illustrative examples of the transition metal compound catalyst components are TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$)$_2$Cl$_2$, Ti(OC$_6$H$_{13}$)$_2$Cl$_2$, Ti(OC$_2$H$_5$)$_2$Br$_2$ and Ti(OC$_{12}$H$_{25}$)Cl$_3$. Mixtures of the transition metal compounds may be used. No restriction on the number of transition metal compounds is made as long as at least one transition metal compound is present.

The support should be an inert solid which is chemically unreactive with any of the components of the catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The preferred catalyst involved in the present invention is a new generation, Ziegler-type titanium catalyst for the polymerization of olefins as is disclosed in U.S. Pat. Nos. 4,816,433 and 4,839,321, hereby incorporated by reference.

The aluminum alkyl is of the general formula AlR'$_3$ where R' is an alkyl of from 1–8 carbon atoms or a halogen and R' may be the same or different with at least one R$^1$ being an alkyl. Examples of aluminum alkyls are trimethyl aluminum (TMA), triethyl aluminum (TEAl), triisobutyl aluminum (TiBAl) and diethyl aluminum chloride (DEAC). The preferred aluminum alkyl is TEAl.

The external electron donor is any one of the electron donors which are effective with Ziegler-type catalysts. Typically, an electron donor is an organosilicon compound. Examples of electron donors are cyclohexylmethyldimethyoxysilane (CMDS), diphenyldimethoxy silane (DPMS) and isobutyltrimethoxysilane (IBMS). Other examples of electron donors are disclosed in U.S. Pat. Nos. 4,218,339; 4,395,360; 4,328,122; 4,473,660; 4,562,173; 4,547,552 and 4,927,797, which are hereby incorporated by reference.

The present invention also provides a process for the polymerization of propylene using the catalyst and the external electron donors described by the above formula comprising:

a) selecting a conventional supported Ziegler-Natta catalyst component for the polymerization of propylene;

b) contacting the catalyst with an organoaluminum compound;

c) contacting the catalyst with an external electron donor as described above;

d) introducing the catalyst into a polymerization reaction zone containing the organoaluminum compound, the electron donor and the monomer under polymerization reaction conditions; and e) extracting polymer product from the reactor.

Although the catalyst system may be used in almost any commercially known polymerization process, the preferred process of the present invention includes a pre-polymerization of the catalyst by contacting a small amount of monomer with the catalyst after the catalyst has been contacted with the electron donor. A pre-polymerization process is described in U.S. Pat. Nos. 4,767,735, and 4,927,797, incorporated by reference above. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor.

Alkoxy silanes, such as cyclohexylmethyldimethoxysilane (CMDS), are commonly used in olefin polymerization as selectivity control agents or external electron donors for supported Ziegler-Natta catalysts. The function of these control agents in propylene polymerization is to increase the selectivity of the catalyst towards the production of isotactic polymer. The catalyst normally produces a product which is a mixture of isotactic and less stereoregular or atactic polymers. The undesirable polymers can be measured as the weight percentage of product which cannot be recrystallized from xylene solvent (xylene solubles test). Increasing the selectivity of the catalyst will lower the percent xylene solubles. Polymerizations were performed using TEAl and CMDS as co-catalysts; the amounts of catalyst and TEAl were held constant while the amount of CMDS was varied.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Approximately 16 mmoles of hydrogen (ΔP=120 psig from a 48.7 Ml bomb) were added to an empty (under ~2 psig nitrogen) and dry 2 L Zipperclave reactor followed by 1.0 L of propylene. The reactor was heated to 70° C. and stirred at approximately 1000 rpm.

1.0 mmol of TEAl was placed in a 40 Ml bomb with 0.02 mmol of CMDS and allowed to precontact for five minutes. 10.0 mg of commercially available Ziegler-Natta catalysts component were precontacted with the TEAl+CMDS mixture in the bomb for two minutes to form a catalyst. The catalyst bomb was connected to an entry port on the reactor.

Propylene was introduced into the bomb for a five second room temperature pre-polymerization, and then the bomb was opened to the reactor and the catalyst was charged by pumping 400 mL of room temperature propylene through the bomb. Total propylene used for polymerization: 1.4 L.

Polymerization continued for one hour during which time the treactor was maintained at the polymerization temperature. At the end of this time polymerization was terminated by rapidly venting the reactor of unreacted monomer. The polymer yield and analysis is shown in Table I.

SUMMARY OF POLYMERIZATION CONDITIONS

| | |
|---|---|
| wt. of catalyst component: | 10.0 mgrams |
| amount of TEAL (co-catalyst): | 1.0 mmoles |
| amount of CMDS (electron donor): | 0.02 mmoles |
| Al/Ti: | 200 |

-continued

| | |
|---|---|
| Al/Si: | 50 |
| Si/Ti: | 4 |
| Hydrogen: | 16 mmol |
| Propylene: | 750 g (1.4L) |
| Temp.: | 70° C. |
| Time: | 60 mins. |

EXAMPLE 2

The same procedure of Example 1 was repeated but 0.05 of CMDS was used.

EXAMPLE 3

The same procedure of Example 1 was repeated but 0.10 of CMDS was used.

EXAMPLE 4

The same procedure of Example 1 was repeated but 0.20 of CMDS was used.

EXAMPLE 5

The same procedure of Example 1 was repeated but 0.50 of CMDS was used.

EXAMPLE 6

The same procedure of Example 1 was repeated but 1.0 of CMDS was used.

TABLE I

For all Examples: - catalyst component - 10 mg
TEA1 - 1.0 mmol
Al/Ti - 200
Polymerization temperature - 70° C.
Polymerization time - 60 minutes

| Example | CMDS (mmol) | Al/Si | YIELD (G) | BULK DENSITY | % XYLENE SOLUBLES |
|---|---|---|---|---|---|
| 1 | 0.02 | 50 | 335 | 0.43 | 4.31 |
| 2 | 0.05 | 20 | 320 | 0.48 | 1.80 |
| 3 | 0.10 | 10 | 281 | 0.48 | 1.40 |
| 4 | 0.20 | 5 | 267 | 0.48 | 1.20 |
| 5 | 0.50 | 2 | 201 | 0.48 | 1.08 |
| 6 | 1.0 | 1 | 83 | 0.44 | 2.08 |

The effect on raw polymer yield by changing the CMDS donor level is shown in FIG. 1. The yield decreases in a nearly linear trend with a decreasing Al/Si molar ratio (i.e., increasing donor level), consistent with an overall suppression or poisoning of the catalyst by donor. Down to an Al/Si ratio of 2, however, the atactic catalyst sites are more selectively poisoned resulting in the decrease in percent xylene solubles shown in FIG. 2. The lowest percent xylene solubles are obtained at an Al/Si ratio of 2.

Figure 3:
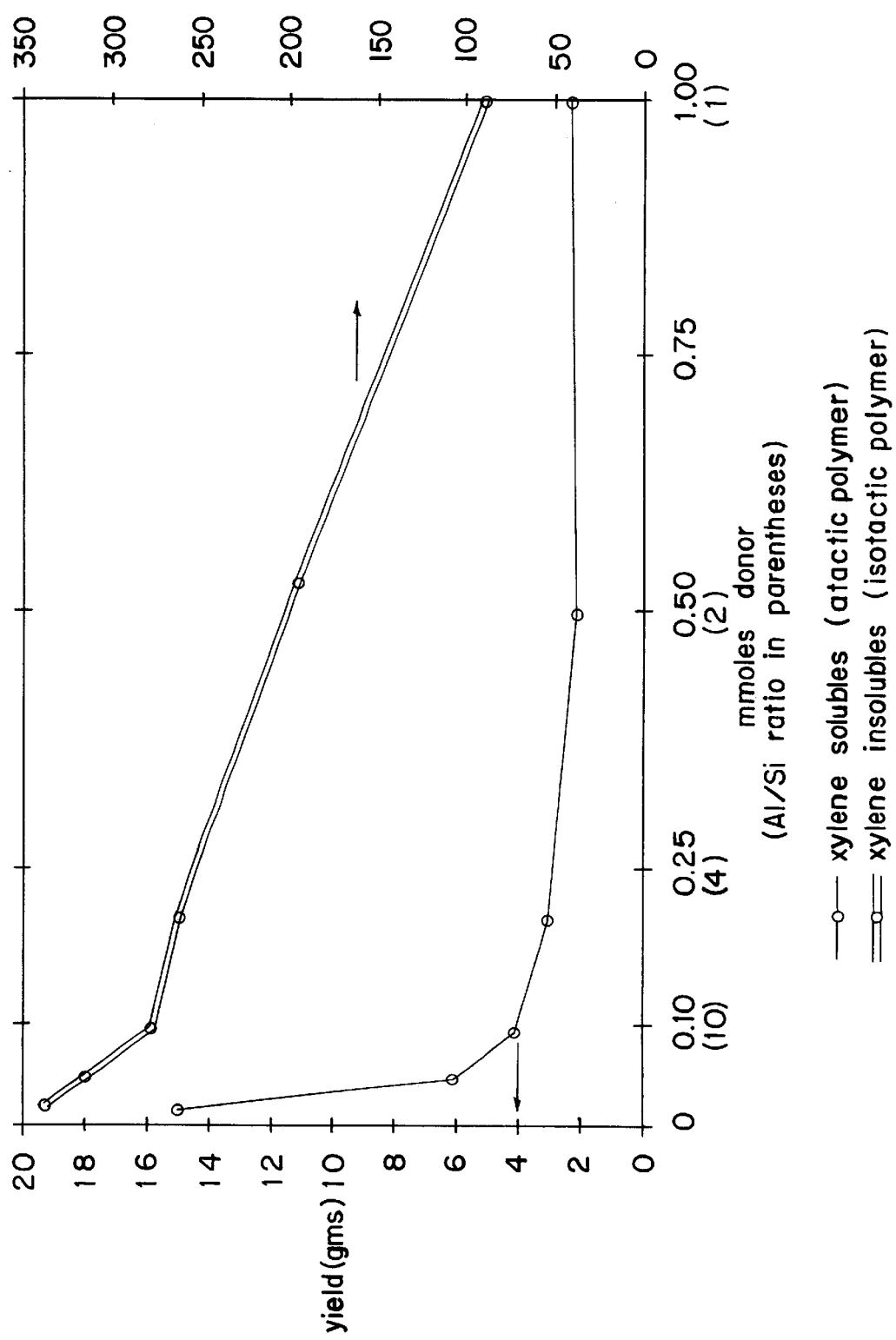
FIG. 3 is a graph of co-catalyst to external electron donor molar ratio versus polymer yield and per cent xylene solubles.

The absolute yields of xylene soluble and xylene insoluble (isotactic) polymers are shown in FIG. 3. The production of xylene soluble polymer decreases rapidly and asymptotically (under these conditions) to two grams at an Al/Si ratio of 2. That is, below an Al/Si ratio of 2 xylene solubles production remains nearly constant and is not further decreased by additional donor. In contrast, the yield of isotactic polymer continues to decrease as donor is added. As the Al/Si ratio is decreased to 2 (by the addition of donor), the decrease in yield of xylene soluble polymer is proportionally greater than the corresponding decrease for isotactic polymer; therefore, percent xylene solubles decrease and reach a minimum as the Al/Si ratio is lowered to 2.

Below this ratio, percent xylene solubles increase since the yield of xylene soluble polymer remains constant but the yield of isotactic polymer decreases. Below an Al/Si ratio of 2, catalyst performance suffers since the polymer yield decreases and percent xylene solubles increase. In such cases, lowering the donor concentration (i.e., raising the Al/Si ratio) will improve the yield and lower the percent xylene solubles.

NMR experiments have shown that TEAl complexes with CMDS in a 2:1 molar ratio; that is, one TEAl molecule will complex with each methoxy group in the CMDS molecule. Thus, an Al/Si ratio of 2 corresponds to the stoichiometry of complexation between Teal and CMDS. When there is sufficient TEAl (i.e., an Al/Si ratio greater than or equal to 2), both methoxy groups are complexed by REAl molecules. Below an Al/Si ratio of 2, free (uncomplexed) CMDS methoxy groups are present since the amount of TEAl present is below stoichiometric proportions.

It follows from the NMR and polymerization data that CMDS has its maximum and optimal effect on percent xylene solubles at the Al/Si ratio where uncomplexed donor species would just become present with a slight increase in donor concentration. The procedure of defining the optimal Al/Si ratio can be applied to other typical silyl ether donors such as isobutyltrimethoxysilane. Near the Al/Si ratio corresponding to the stoichiometry of complexation between aluminum alkyl and donor, both the weight and relative (or percentage) yield of xylene soluble polymer will be at or near the lowest level achievable for a given donor and a given set of polymerization conditions (e.g., temperature, Al/Ti ratio).

The Al/Si ratio so defined presumes that the combination of aluminum alkyl and donor comprises a relatively stable system. Further reaction or decomposition of the aluminum alkyl/donor complex to yield new donor species is one possible complication which would require some modification of the Al/Si ratio. However, as for the stoichiometry of complexation, the nature and degree of this condition can be assessed by NMR study.

NMR studies have been reported in Soga, K.; Shiono, T. in "Transition Metal Catalyzed Polymerizations: Ziegler-Natta and Metathesis Polymerizations", Quirk, R. P., Ed., Cambridge University Press: New York, 1988, p. 266; Vahasarja, E.; Pakkanen, T. T.; Pakkanen, T. A.; liskola, E.; Sormunen, P. J. *Polymer Sci. Polv. Chem. Ed.* 1987, 25 3241; Sormunen, P.; liskola, E.; Vahasarja, E.; Pakkanen, T. T.; Pakkanen, T. A. *J. Organomet. Chem.* 1987, 319, 327; liskola, E.; Sormunen, P.; Garoff, T.; Vahasarja, E.; Pakkanen, T. T.; Pakkanen, T. A. in "Transition Metals and Organometallics as Catalysts for Olefin Polymerization"; Kaminsky, W.; Sinn, H.; Eds., Springer-Verlag; New York, 1988, p. 113 for the complexation of phenyltriethoxysilane (PTES) with triethylaluminum (TEAl); the disclosures of these articles are hereby incorporated by reference.

Figure 2:
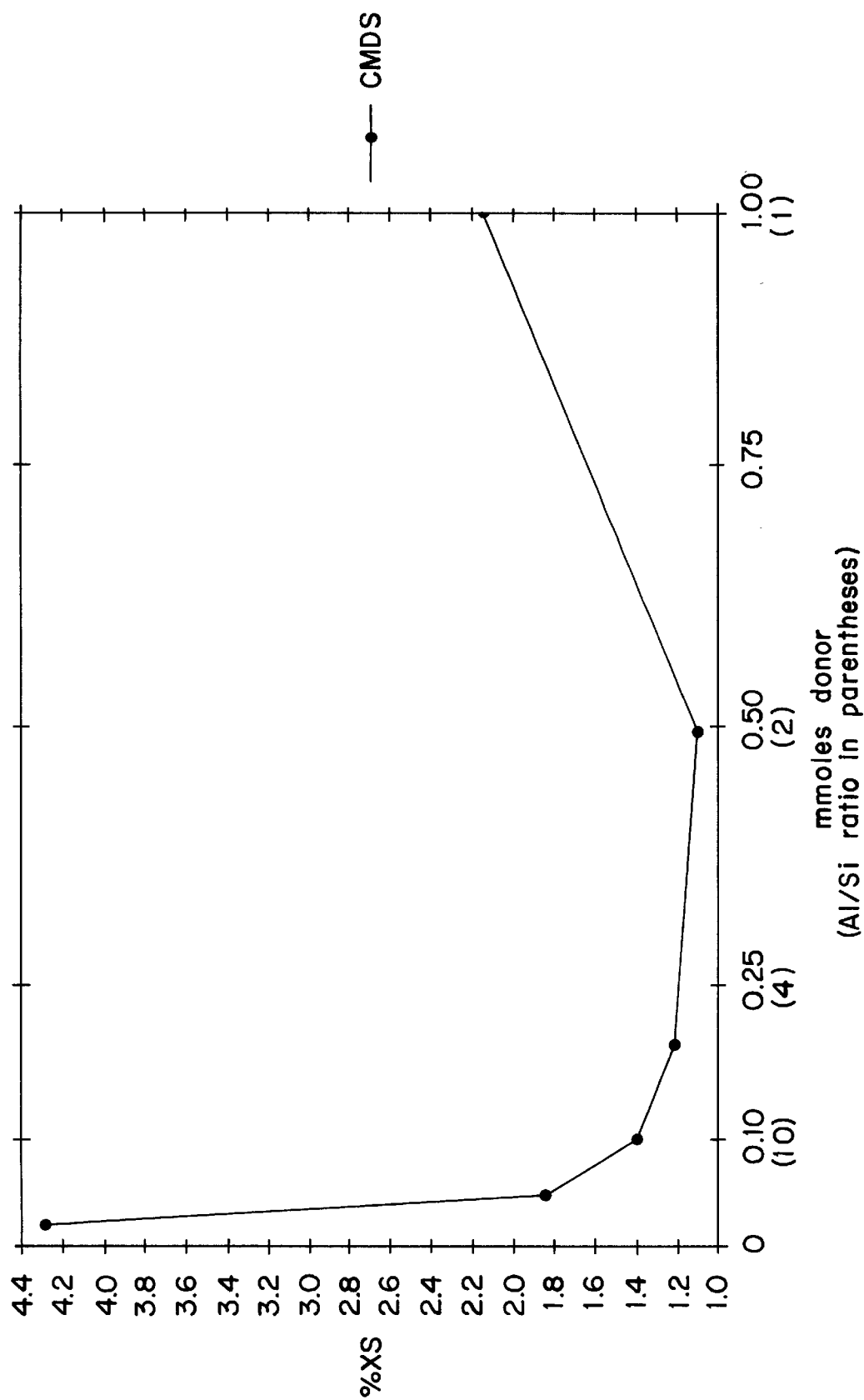
FIG. 2 is a graph of co-catalyst to external electron donor molar ratio versus per cent xylene solubles.

High xylene solubles are also obtained under low silane conditions, but the level of xylene solubles becomes very sensitive to the donor concentration. As shown in FIGS. 2 and 3, under these conditions xylene solubles change dramatically in the vicinity of an Al/Si ratio of 10. Above this ratio (lower donor concentration), small changes in the donor level cause relatively large changes in both the weight and relative (percentage) yield of xylene solubles. This is in contrast, for example, to an Al/Si ratio range of 5 to 2 where low xylene solubles are obtained and, additionally, the slope of change in percent xylene solubles is less pronounced.

Obviously, numerous modifications and variations of the present invention are possible in light of the above teachings. It is therefore to be understood that within the scope of the appended claims, the invention may be practiced otherwise than as specifically described herein.

What is climed as new and desired to be secured by Letter of Patent of the United States of America is:

1. A catalyst for the polymerization of propylene monomer to a polypropylene product wherein the xylene solubles are minimized, said catalyst comprising:
   a) a conventional supported Ziegler-Natta transition metal compound catalyst component for the polymerization of propylene having the general formula $MR^+_x$ where M is a Group IVB metal, $R^+$ is selected from the group consisting of a halogen and a hydrocarbyloxy, $R^+$ being the same or different with at least one $R^+$ being a halogen, and x is the valence of the metal;
   b) an aluminum trialkyl co-catalyst described by the formula $AlR'_3$ where R' is an alkyl of from 1–8 carbon atoms and R' may be the same or different; and
   c) cyclohexylmethyldimethoxylsilane as an external electron donor;
wherein the molar ratio of co-catalyst to external electron donor is 2.

2. A catalyst as recited in claim 1 wherein the aluminum trialkyl co-catalyst is triethylaluminum.

3. A process for making a catalyst for the polymerization of propylene monomer to a polypropylene product wherein the xylene solubles are minimized by the steps comprising:
   a) selecting a conventional supported Ziegler-Natta transition metal compound catalyst component having the general formula $MR^+_x$ where M is a Group IVB metal, $R^+$ is selected from the group consisting of a halogen and a hydrocarbyloxy, $R^+$ being the same or different with at least one $R^+$ being a halogen, and x is the valence of the metal for the polymerization of propylene;
   b) contacting that catalyst component with an aluminum trialkyl co-catalyst described by the formula $AlR'_3$ where R' is an alkyl of from 1–8 carbon atoms and R' may be the same or different; and
   c) contacting said catalyst component with cyclohexylmethyldimethoxysilane as an external electron donor either simultaneously with or after step b),
wherein the molar ratio of co-catalyst to external electron donor is 2.

4. A process as recited in claim 3 wherein the aluminum trialkyl co-catalyst is triethylaluminum.

* * * * *

UNITED STATES PATENT AND TRADEMARK OFFICE
CERTIFICATE OF CORRECTION

PATENT NO.    : 6,255,247 B1
DATED         : July 3, 2001
INVENTOR(S)   : Edwar Shoukri Shamshoum and David John Rauscher It is certified that error appears in the above-identified patent and that said Letters Patent is hereby corrected as shown below:

<u>Title page,</u>
Item [57], ABSTRACT, should read
-- The invention is for a process for the polymerization of propylene to a minimum level of xylene solubles by use of the molar ratio of co-catalyst to external electron donor (selectivity control agent). Using a conventional supported heterogeneous Ziegler-Natta catalyst component with an trialkyl aluminum co-catalyst and an cycloalkylalkyl-dialkoxysilane external electron donor (selectivity control agent) in a Al/Si molar ratio of about 2 results in the minimum amount of xylene solubles.

Signed and Sealed this

Fourteenth Day of May, 2002

*Attest:*

*Attesting Officer*

JAMES E. ROGAN
*Director of the United States Patent and Trademark Office*